US006991238B2

(12) United States Patent
Yang et al.

(10) Patent No.: US 6,991,238 B2
(45) Date of Patent: Jan. 31, 2006

(54) LOCKING DRILL CHUCK

(75) Inventors: Guimo Yang, Wendeng (CN); Yanzhao Li, Wendeng (CN)

(73) Assignee: Shandong Weida Machinery Co., Ltd., (CN)

( * ) Notice: Subject to any disclaimer, the term of this patent is extended or adjusted under 35 U.S.C. 154(b) by 0 days.

(21) Appl. No.: 10/891,290

(22) Filed: Jul. 14, 2004

(65) Prior Publication Data

US 2005/0023775 A1    Feb. 3, 2005

(30) Foreign Application Priority Data

Jul. 15, 2003  (CN) .............................. 03138814 A

(51) Int. Cl.
*B23B 31/12* (2006.01)
(52) U.S. Cl. ...................................................... 279/62
(58) Field of Classification Search ................... 279/60, 279/61, 62, 140, 902; 384/609, 611, 615, 384/617
See application file for complete search history.

(56) References Cited

U.S. PATENT DOCUMENTS

| 1,473,488 | A | * | 11/1923 | McConnell | ................... | 279/62 |
| 2,009,964 | A | * | 7/1935 | Mottlau | ...................... | 192/45 |
| 2,292,470 | A | * | 8/1942 | Ostberg | ....................... | 279/60 |
| 2,910,302 | A | * | 10/1959 | Ondeck | ........................ | 279/22 |
| 3,807,745 | A | * | 4/1974 | Bent | ............................... | 279/60 |
| 5,145,194 | A | * | 9/1992 | Huff et al. | ..................... | 279/62 |
| 5,215,317 | A | * | 6/1993 | Jordan et al. | .................. | 279/63 |
| 5,411,275 | A | * | 5/1995 | Huff et al. | ..................... | 279/62 |
| 5,531,461 | A | * | 7/1996 | Huff et al. | ..................... | 279/62 |
| 5,615,899 | A | * | 4/1997 | Sakamaki | ..................... | 279/62 |
| 5,669,616 | A | * | 9/1997 | Ho | ................................ | 279/62 |
| 5,816,582 | A | * | 10/1998 | Steadings et al. | ............. | 279/62 |
| 5,984,320 | A | * | 11/1999 | Nakamura | .................... | 279/62 |
| 6,354,604 | B1 | * | 3/2002 | Nicolai | ........................ | 277/641 |

* cited by examiner

*Primary Examiner*—Boyer D. Ashley
*Assistant Examiner*—Michael W. Talbot
(74) *Attorney, Agent, or Firm*—Christopher P. Maiorana, PC

(57) ABSTRACT

A locking drill chuck comprises a chuck body, a plurality of jaws, a nut, a nut jacket, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises a locking sleeve provided between the front sleeve and the rear sleeve, and a locking assembly provided between the nut and a stop plane of the chuck body, the locking assembly comprises a locking cap, rolling members, and a locking plate, wherein the locking plate has a plurality of helical grooves with helix angle in an end plane thereof, the rolling members are received in the helical grooves, the locking cap has resilient tabs securing the locking plate together with the plurality of rolling members, and the locking sleeve securely connected to the locking plate. The locking drill chuck in accordance with the present invention is reasonable in structures, easy for assembly, steady in performance, and labor saving, convenient and reliable in operating.

18 Claims, 8 Drawing Sheets

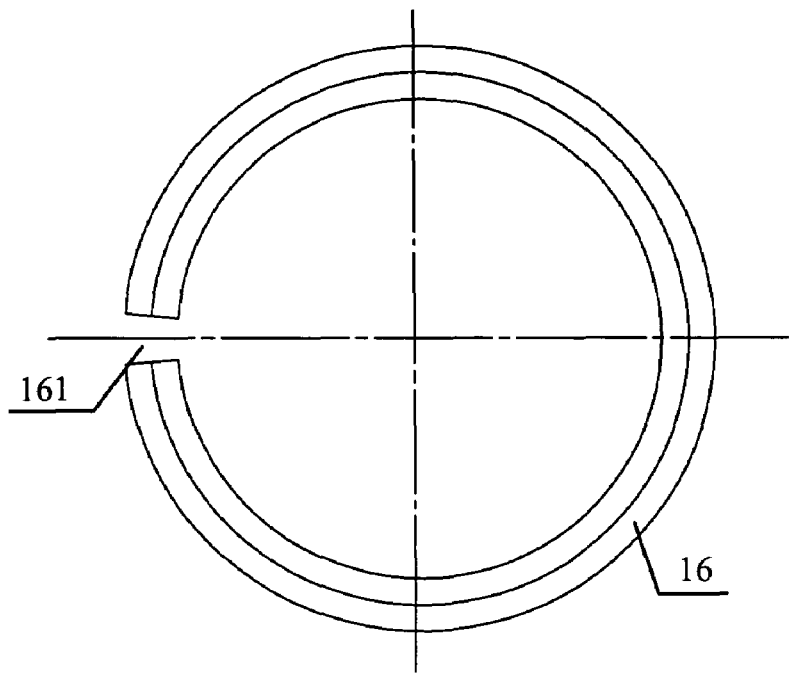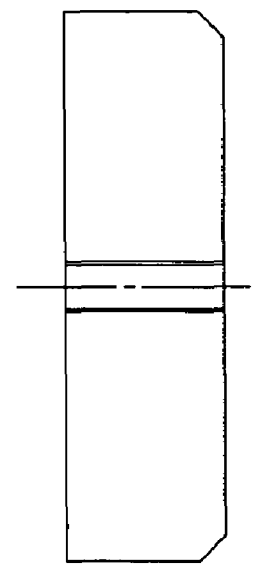
FIG. 8A  FIG. 8B
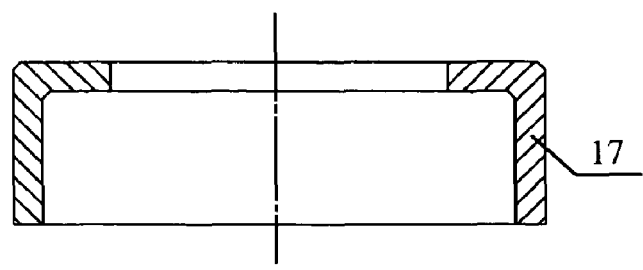
FIG. 9

LOCKING DRILL CHUCK

This application claims the benefit of the Chinese patent application No. 03138814.0 filed on Jul. 15, 2003, which is hereby incorporated by reference.

1. Technical Field

The present invention relates to a drill chuck device, in particular, a locking drill chuck.

2. Background Art

A conventional drill chuck comprises a chuck body, a plurality of (for example, three) jaws, a nut, an exterior sleeve comprising a front sleeve and a rear sleeve, etc., and further comprises a bearing and a bearing spacer in the case of manual locking drill chuck for reducing friction. The rear sleeve and the bearing spacer are close fitted to the chuck body, respectively. The three jaws are separately mounted in three corresponding inclined holes equally parted from each other in the chuck body. The nut is deposited in a nut slot of the chuck body, and forms a screw drive mechanism associated with the screw thread of the jaws. The nut also has a nut jacket around and closely fitted therewith. Around the nut jacket is the front sleeve that has keys in its inner wall and in the nut jacket there are recesses corresponding to the keys, such that the front sleeve can be interconnected with the nut jacket via the keys. For preventing the front sleeve from axial shifting, a buffer is close fitted in the front end of the chuck body.

In the use, one may manually rotate the front sleeve, in turn the front sleeve drives the nut jacket and the nut, and then the nut drives the jaws move forward and backward in the inclined hole of the chuck body, so that the three jaws are splayed or closed for complete the loosening and clamping of a drill tool.

However, there are some disadvantages in the prior art that the drill chuck tends to be loosening due to vibration and impact during operation, these results in that the work efficiency is badly influenced and the safety property is poor. With the broadly increasing application of the drill chuck, the request to the product in its working reliability becomes higher and higher. However, the prior art drill chuck is distinctly insufficient in performance of clamping and loosening.

SUMMARY OF THE INVENTION

An objective of the present invention is to provide a locking drill chuck with a reasonable structure, secure locking power and high efficiency in torque transmitting, such that it is light and convenient in operating and reliable in clamping and locking.

The locking drill chuck in accordance with the present invention comprises a chuck body, a plurality of jaws, a nut, a nut jacket, a front sleeve, and a rear sleeve, wherein the chuck body has an axial hole at its rear end for engaging with a driving shaft of a driving means, and the rear sleeve close fits with the outer circumference of the rear end of the chuck body, the jaws are separately fitted in a plurality of corresponding inclined holes equally departed away from each other in the chuck body, the nut engages with the jaws, the locking drill chuck further comprises a locking sleeve provided between the front sleeve and the rear sleeve; and a locking assembly provided between the nut and a stop plane of the chuck body, the locking assembly comprises a locking cap, rolling members, and a locking plate, wherein the locking plate has a plurality of helical grooves with helix angle in an end plane thereof, the rolling members is received in the helical grooves, the locking cap has resilient tabs securing the locking plate together with the plurality of rolling members, and the locking sleeve securely connected to the locking plate.

Each of the helical grooves comprises a section $\lambda1$ where the helix angle is not equal to 0 and a section $\lambda2$ where the helix angle is equal to 0.

The locking sleeve has connecting tenons on its inner circumference, and the locking plate has recesses in a lower portion of its outer circumference, the tenons and the recesses are fitted together with zero clearance.

The locking sleeve has a plurality of tenons on a central portion of its outer circumference, and the front sleeve has a plurality of recesses with a width larger than that of the tenons for receiving the tenons.

The drill chuck further comprises a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, so that the locking sleeve is positioned and guided in the front sleeve.

The drill chuck further comprises a driving sleeve deposited between the front sleeve, and the nut and the nut jacket, the driving sleeve has a plurality of resilient pawls around its outer circumference and has a plurality of driving key at its upper end, the front sleeve has a plurality of fitted slot in its inner circumference for receiving the resilient pawls, and the nut has a plurality of recesses at its lower end, so that the front sleeve drives the driving sleeve and thereby the nut to transmit torque.

The locking plate has a plurality of locking flumes in the lower portion of its outer circumference, and correspondingly the locking cap has a plurality of resilient tabs, the resilient tabs may fit in and move along the locking flumes.

The drill chuck further comprises a baffle ring rotatablely mounted between the lower ends of the front sleeve and the chuck body to prevent the sleeve from axial shifting with respect to the chuck body.

The baffle ring has an circumferential opening, and having a skirt close fitted thereto, thereby the baffle ring may fit in an annular groove formed in a lower portion of the chuck body, and resist against a rabbet at the lower end of the front sleeve.

Thanks to the above-mentioned structures, the drill chuck according to the present invention possesses a secondary locking function with particular methods for imputing torque and locking by an interlocking mechanism in addition to the first screw locking function between the nut and jaws, and further provides an new structure where the front sleeve is connected to the chuck body to prevent the front sleeve from shifting away. So the drill chuck according to the present invention is reasonable in structures, easy for assembly, steady in performance, and labor saving, convenient and reliable in operating.

BRIEF DESCRIPTION OF THE DRAWINGS

The above and other objectives and features of the present invention will become apparent from the following description of preferred embodiments, given in conjunction with the accompanying drawings, in which:

FIG. 2 is a schematic view of a locking plate of the locking drill chuck according to present invention, wherein

FIG. 3 is a schematic view of a locking sleeve of the locking drill chuck according to the present invention, wherein

FIG. 4 is a schematic view of a locking cap of the locking drill chuck according to the present invention, wherein

FIG. 5 is a schematic view of structures of a driving sleeve of the locking drill chuck according to the present invention, wherein

FIG. 6 is a schematic view of a front sleeve of the locking drill chuck according to the present invention, wherein

FIG. 7 is a schematic view of a resilient interlock of the locking drill chuck according to the present invention, wherein

FIG. 8 is a schematic view of a baffle ring of the locking drill chuck according to the present invention, wherein FIG. 8A is a plane view of the baffle ring, and FIG. 8B is a left view of the baffle ring; and FIG. 9 is a cross-sectional view of a skirt of the locking drill chuck according to the present invention.

DESCRIPTION OF PREFERRED EMBODIMENTS

Figure 1:
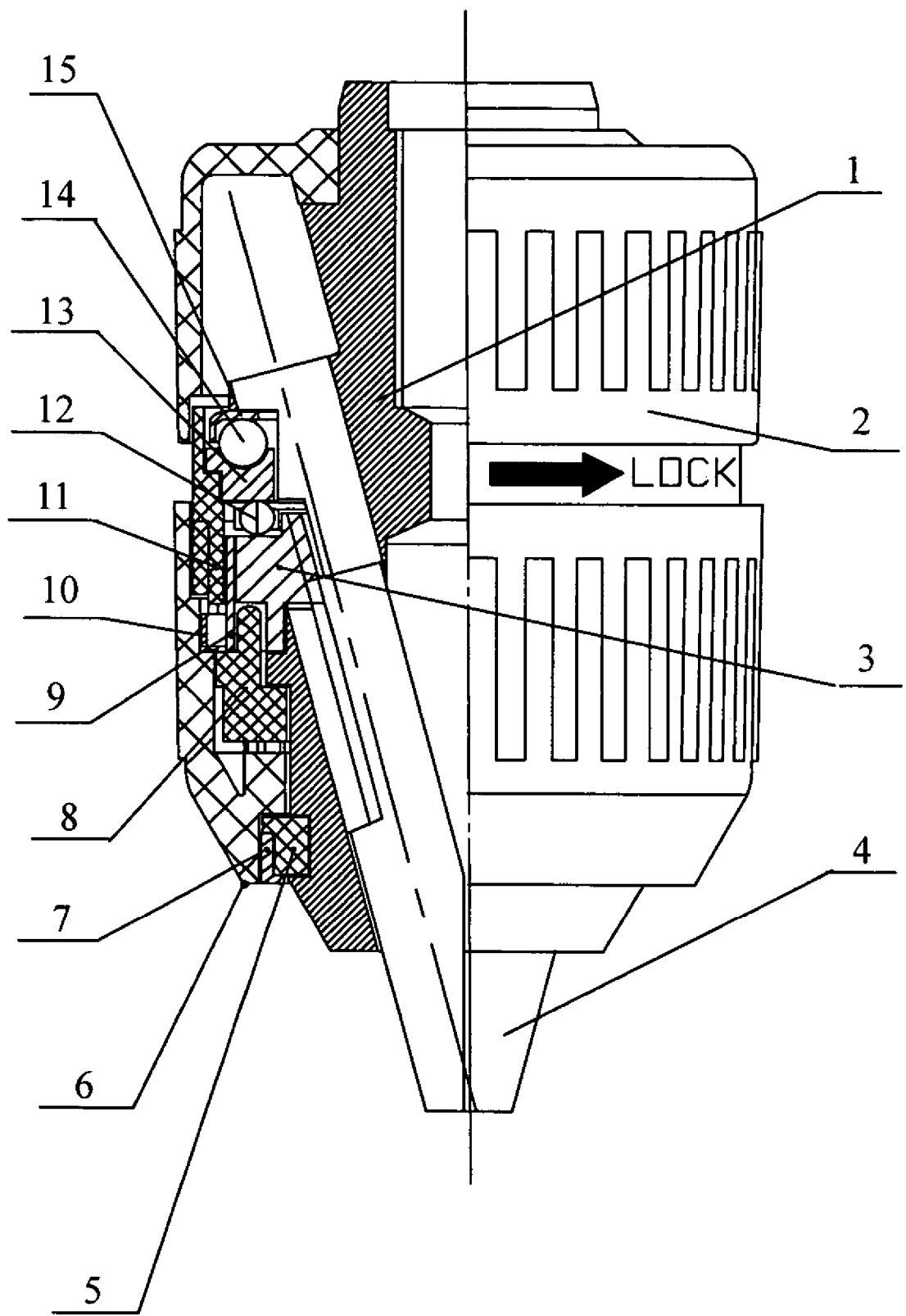
FIG. 1 is a schematic view, partly in cross-section, of a locking drill chuck in accordance with an embodiment of the present invention.
Figure 2A:
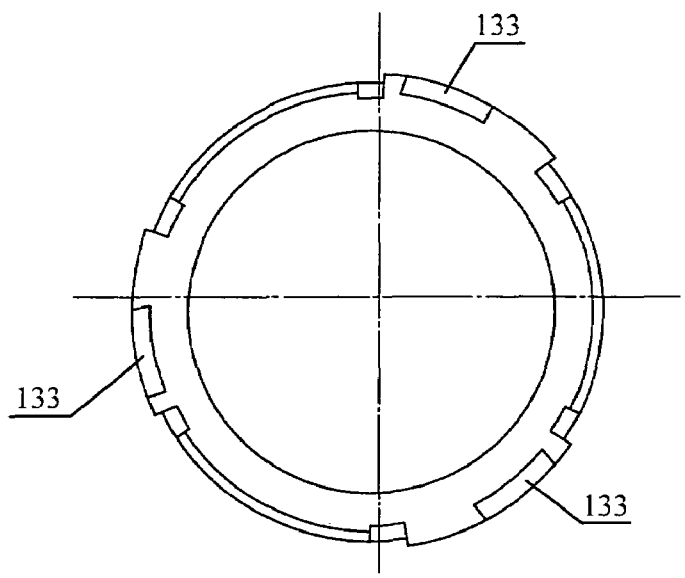
FIG. 2A is a bottom view of the locking plate.
Figure 2B:
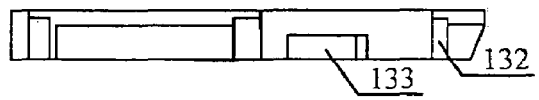
FIG. 2B is a front view of the locking plate.
Figure 2C:
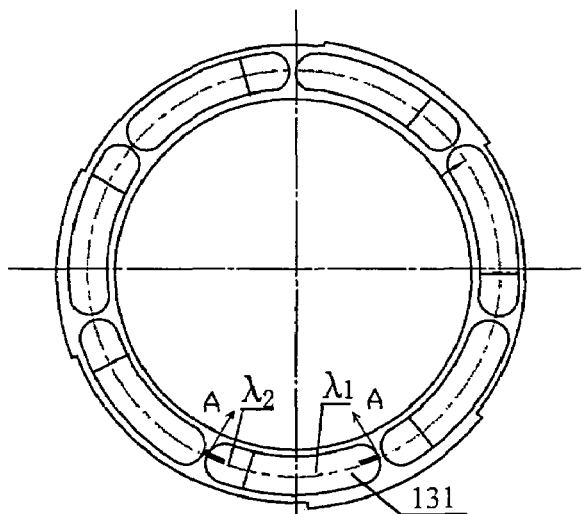
FIG. 2C is a top view of the locking plate.
Figure 2D:
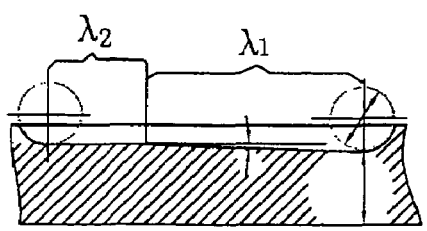
FIG. 2D is an enlarged cross-sectional view of the locking plate taken along line A—A of FIG. 2C.

As shown in FIG. 1, the present invention relates to a locking drill chuck, which comprises a chuck body 1, a plurality of (for example, three) jaws 4, a nut 3, a front sleeve 6, a rear sleeve 2, and a bearing 12. The chuck body 1 has an axial hole at its rear end for engaging with a driving shaft of a driving means, and the rear sleeve 2 close fits with the outer circumference of the rear end of chuck body 1. The three jaws 4 are separately mounted in three corresponding inclined holes equally departed away from each other in the chuck body 1. The nut 3 engages with the jaws 4 in the inclined holes of the chuck body and the outer circumference of the nut 3 is connected and secured to the front sleeve 6. There is a nut jacket 9 between the front sleeve 6 and the nut 3. The preceding components, structures and connecting relationship are all prior art and the detailed description will be omitted.

What the present invention is characterized in is that there are a locking sleeve 11 provided between the front sleeve 6 and the rear sleeve 2 around the chuck body 1, and a elastic locking assembly comprising a locking cap 15, a plurality of rolling bodies, such as steel ball 14, and a locking plate 13 between the stop plane of chuck body 1 and the nut 3.

As shown in FIGS. 2A, 2B, 2C, and 2D, in upper end plane of the locking plate 13 there are a plurality of grooves 131 with helix angle. There is a rolling body provided in each of the helical grooves 131, such as a steel ball 14. Each of the grooves 131 in the end plane of the locking plate comprises two sections, i.e. λ1 and λ2. Both sections λ1 and sections λ2 in all the grooves 131 have the same helix angle, respectively. That is, for the sections λ1 or sections λ2, it may be regarded as a plurality of groove sections axially duplicated in a same level plane by one groove section taken from a complete helicoids. Alternatively, the curved surface may also be duplicated in other end planes being pressed shown in FIG. 1, i.e., the pressed end plane of the locking cap, the chuck body or the nut.

The locking plate 13 has a plurality of locking flumes 132 at a lower portion of its outer circumference for connecting with the locking cap 15, and the locking plate 13 has a plurality of recesses 133 for connecting with the locking sleeve 11, such that an elastic locking assembly is formed. The locking sleeve 11 in accordance with the present invention may be a separate middle sleeve or may be connected with the front sleeve 6 to become an attached sleeve interlocked.

Figure 4A:
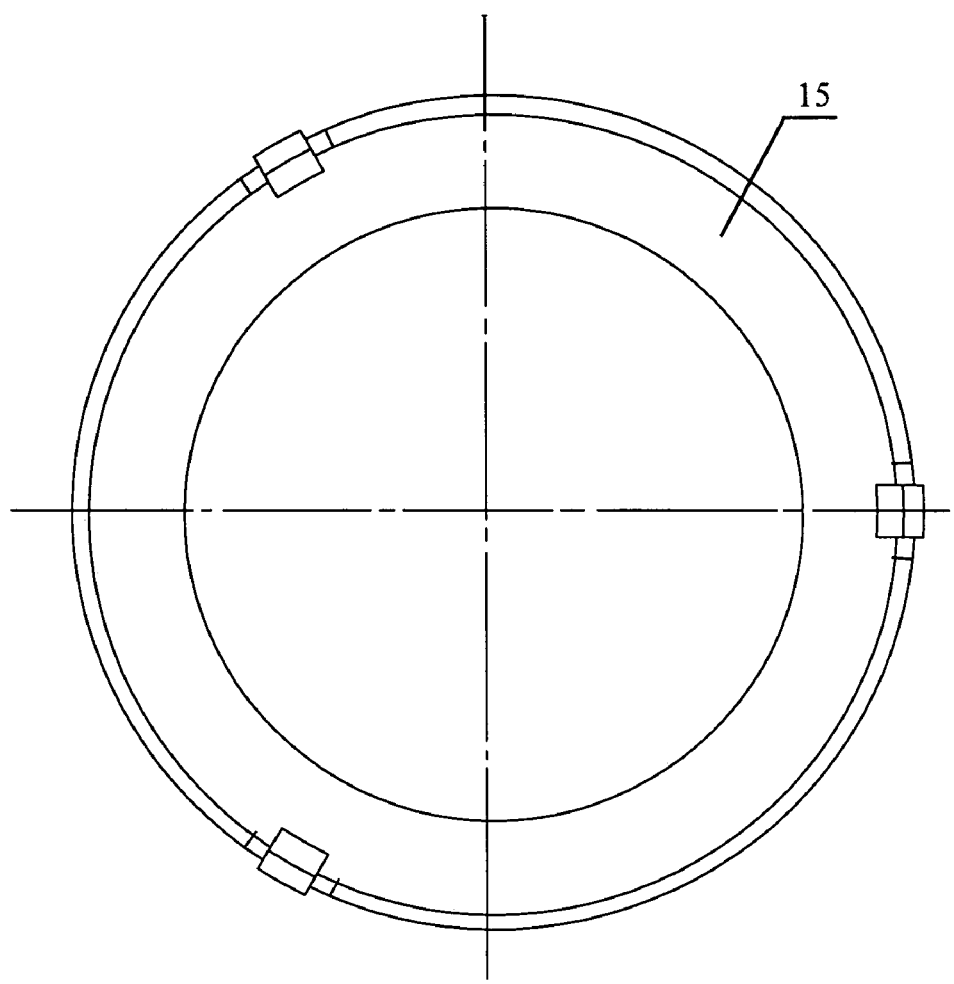
FIG. 4A is a bottom view of the locking cap.
Figure 4B:
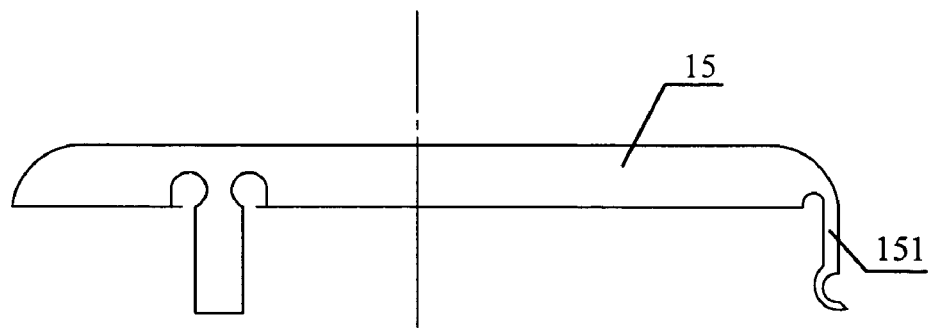
FIG. 4B is a front view of the locking cap.

As shown in FIGS. 4A and 4B, the locking cap 15 has a plurality of resilient tabs 151 which may move along and be positioned in the locking flume 132 at the lower end of the outer circumference of the locking plate 13. The steel balls 14 are placed in the helical grooves 131 in the end plane of the locking plate 13. The locking plate 13 and the steel balls 14 are interlocked together by the resilient tabs 151 of the locking cap 15.

Figure 3A:
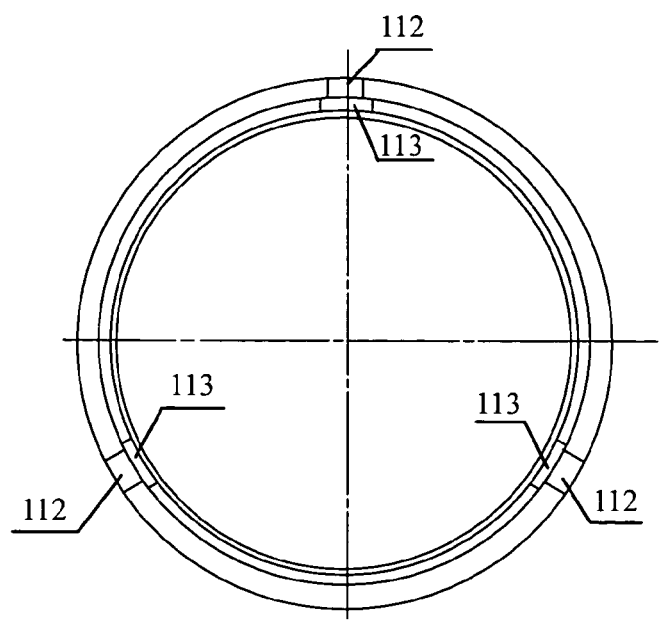
FIG. 3A is a bottom view of the locking sleeve.
Figure 3B:
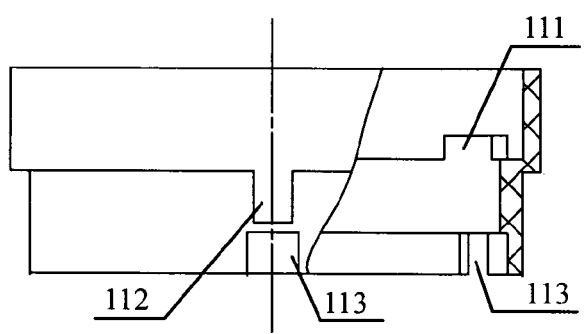
FIG. 3B is a front view of the locking sleeve.
Figure 3C:
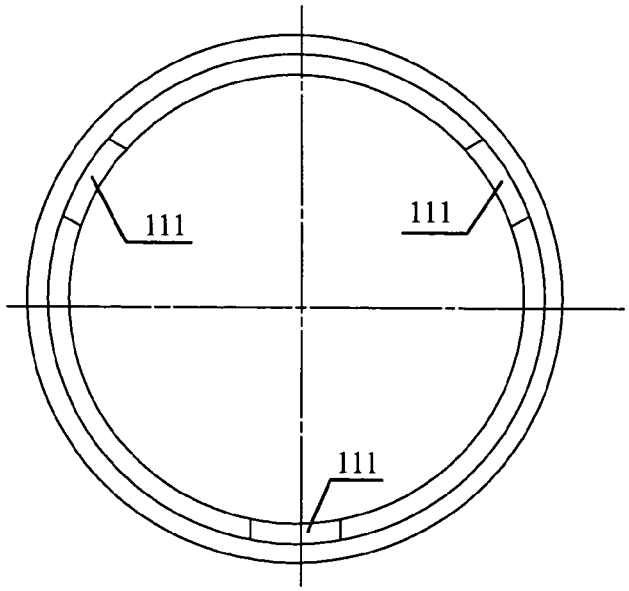
FIG. 3C is a top view of the locking sleeve.

The locking sleeve 11 is connected to the recesses of the locking plate 13. FIG. 3 is a schematic view of structures of a locking sleeve 11. As shown in FIGS. 3A, 3B, and 3C, the locking sleeve 11 has tenons 111 for connecting to the corresponding recesses 133 at a lower portion of the outer circumference of the locking plate 13.

Figure 6A:
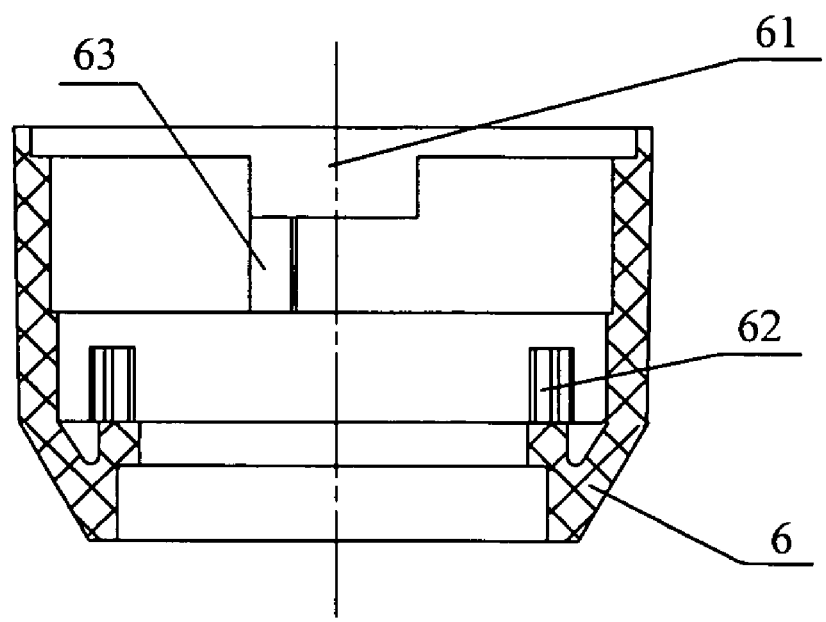
FIG. 6A is a cross sectional view of the front sleeve.
Figure 6B:
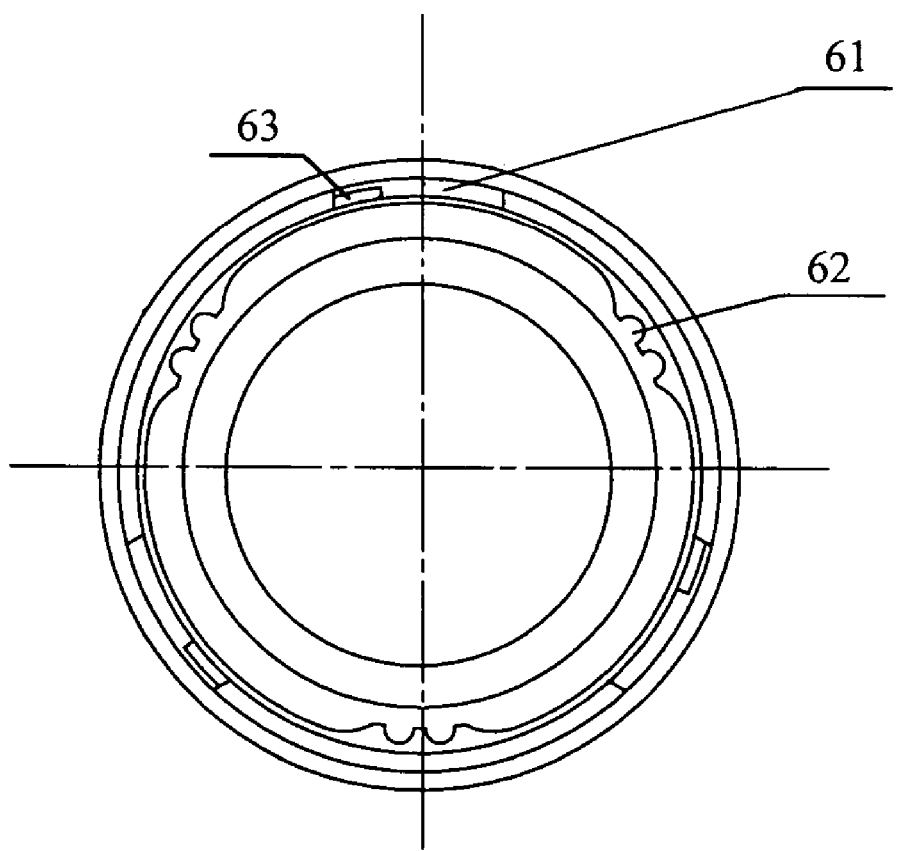
FIG. 6B is a top view of the front sleeve.
Figure 7A:
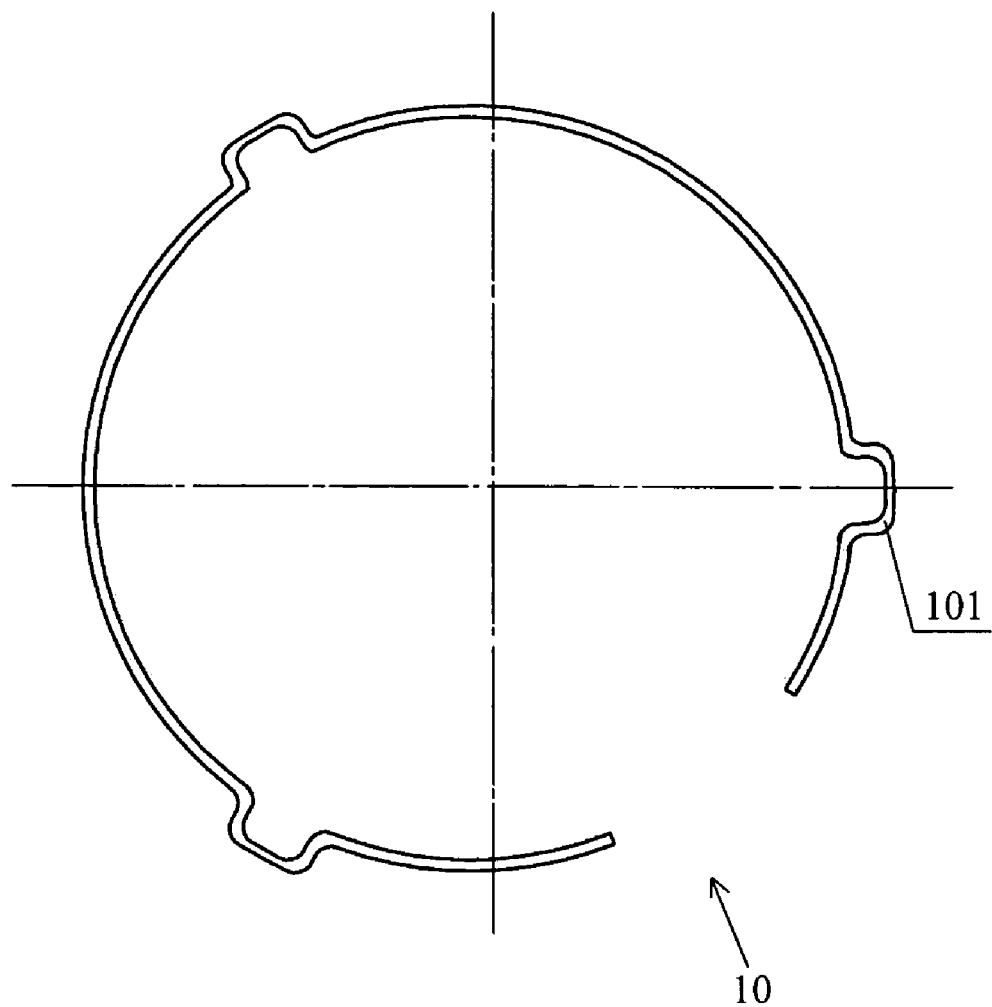
FIG. 7A is a bottom view of the resilient interlock.
Figure 7B:
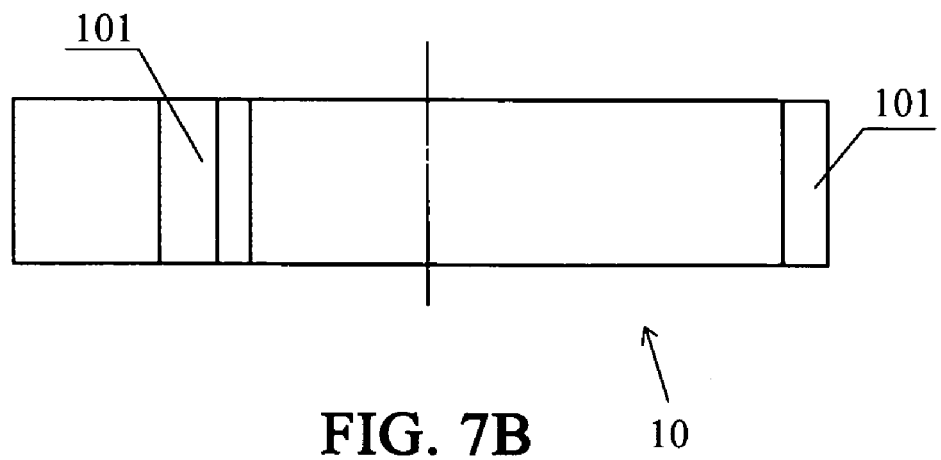
FIG. 7B is a front view of the resilient interlock.

The locking sleeve 11 and the locking plate 13 are connected together through tenons 111 and recesses 133. The locking sleeve 11 also has a plurality of tenons 112 at the middle part of its outer circumference and has opening interlocking notches 113 below the tenons 112. A resilient interlock 10 is provided in the locking sleeve 11. The resilient interlock 10 an opening and a plurality of projection 101 that correspond to and pass through the interlocking notches 113 of the locking sleeve 11. And meanwhile, as shown in FIGS. 6A and 6B, the front sleeve 6 has a plurality of circumferential recesses 61 in its inner circumference with a width larger than that of the tenons 112 of the locking sleeve 11 for receiving the tenons 112, thus there is a big gap provided between the laterals of the tenons 112 and the recesses 61. The front sleeve 6 also has a plurality of axial interlocking slots 63 for receiving the corresponding projections 101 of the resilient interlock 10 passed through the interlocking notches 113 of the locking sleeve 11.

Thus, the locking sleeve 11 is positioned and guided in the front sleeve 6 by the interlocking notches 113, the interlocking slots 63, and the projection 101 fitted together, and one side of each tenon 112 of the locking sleeve 11 abuts one side of the each recess 61 of the front sleeve 6, thereby a synchronous movement and detachment of the front sleeve 6 and the locking sleeve 11 are achieved.

Figure 5A:
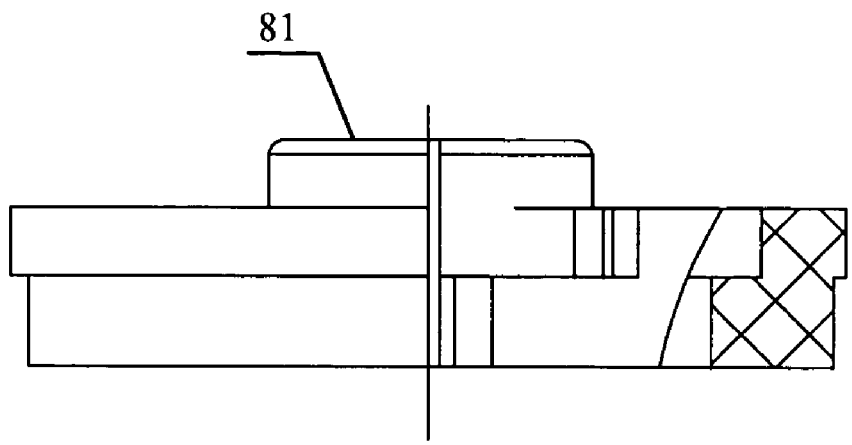
FIG. 5A is a front view, partly in cross-section, of the driving sleeve.
Figure 5B:
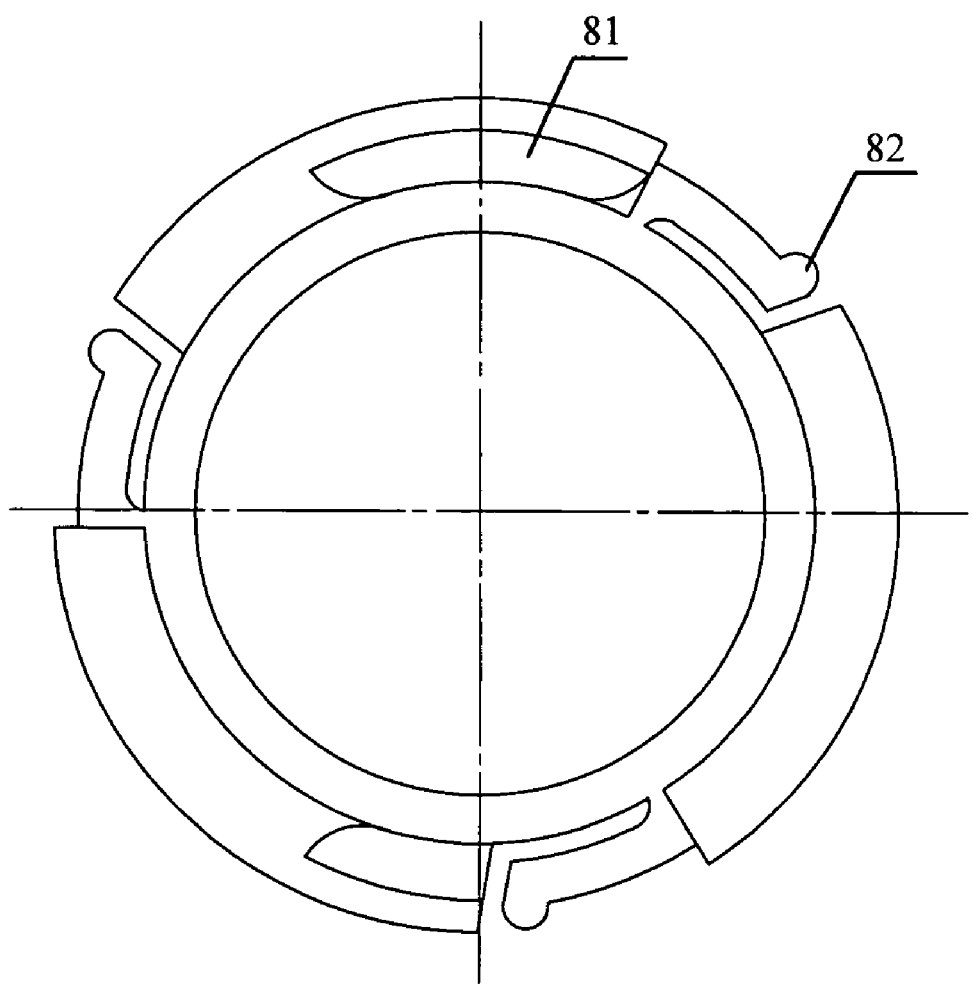
FIG. 5B is a top view of the driving sleeve.

A driving sleeve 8 is further deposited between the front sleeve 6 and the nut 3, the nut jacket 9 in accordance with the present invention. As shown in FIG. 5, the driving sleeve 8 has a plurality of driving keys 81 inserted into a plurality of recesses (not shown) at a lower part of the nut 3 with a small gap, and the three resilient pawls 82 in the outer circumference of the driving sleeve 8 fits with the fitted slots 62 of the front sleeve 6 for transmitting the torque to the nut 3, thereby the nut 3 can drive the jaws 4 to clamp firmly. When the imputed torque reaches a value range predetermined, the three resilient pawls 82 disengage from the fitted slots 62 of the front sleeve 6 automatically, and the nut 3 will not rotate any more. Thereafter, the transmitting path of the torque is changed so that the front sleeve 6 accomplishes the force imputes through the locking sleeve 11.

As to the positioning of the front sleeve 6, as shown in FIG. 1, there is a baffle ring 5 rotatablely mounted in an annular groove formed in a front portion of the chuck body 1. The baffle ring 5 resists against a rabbet at the lower end of the front sleeve 6 and has a skirt 7 close fitted thereto. The baffle ring 5 has a circumferential opening, so that the front sleeve 6 may rotate freely relative to the chuck body 1 and meanwhile prevent itself from being shifted axially.

Next, the operation of the present invention will be described as following.

As shown in FIG. 1, when an exterior force is applied to the front sleeve 6, the front sleeve 6 rotates and drives the driving sleeve 8 and furthers the nut 3, and in turn makes the jaws 4 to move forward. Thereby the front ends of the jaws 4 approach the drill tool to be clamped, and meanwhile the resilient interlock 10 is driven by the front sleeve 6 and rotates synchronistically with the locking assembly. When the front ends of the jaws move against an outer surface of the drill tool to be clamped, the torque imputed increases so that the drill tool is clamped.

At the same time, the resilient interlock 10 disengages from the interlocking slot 63 of the front sleeve 6, and locking cap 15 ceases rotating owing to the increasing friction between the locking cap 15 and a stop plane of the chuck body 1. If the imputed torque reaches a certain range of value, the three resilient pawls 82 of the driving sleeve 8 will disengage from the fitted slot 62 of the front sleeve 6, such that the nut 3 doesn't rotate any longer. After the front sleeve 6 has passed solely a certain angle corresponding to the foregoing big gap provided between the laterals of the tenons 112 and the recesses 61, the circumferential recesses 61 in the inner circumference of the front sleeve 6 come into contact at their another side with the tenon 112 in the central portion of the outer circumference of the locking sleeve 11, and drives the locking plate 13 to rotate. At this time the locking cap 15 keeps on unmoving owing to being pressed, which results in the rolling members, such as a steel balls 14, to roll in an opposite direction along the helical grooves 131 in the end plane of the locking plate 13 from the site of $\lambda 1$ in the helical grooves where the helix angle is not equal to 0 to a horizontal section, i.e. the site of $\lambda 2$ in the helical grooves where the helix angle is equal to 0 so as to be in a state of locking. In the meanwhile, the three resilient tabs 151 of the locking cap 15 slide into another locking flume 132 of the locking plate 13.

During this operation, in aspect of principal, the locking assembly acts as a further locking nut for a secondary securing and locking function in addition to the locking function of screw thread between the nut 8 and jaws 4, when the working screw threads between the jaw 4 and nut 3 possess a powerful axial deformation differed from that in the prior art, which prevents the nut 3 from any tendency of rotation, thereby the reliable clamping and locking is reached.

Contrarily, in order to loosen the locking drill chuck, it is only required to rotate the front sleeve 6 in an opposite direction, and then the front sleeve 6 drives the locking sleeve 11 and further the locking plate 13 and disengages the locking flumes 132 of the locking plate 13 from the three resilient tabs 151 of the locking cap 15. At the same time, the steel balls 14 move from the site of sections $\lambda 2$ of the helical grooves 131 where the helix angle is equal to 0 to the site of sections $\lambda 1$ where the helix angle is not equal to 0, so that the three resilient tabs 151 of the locking cap 15 slide in an reverse direction into another locking flumes 132 of the locking plate 13, thereby the axial powerful deformation of fitted screw thread of the jaws 4 and the nut 3 is released. Then the nut 3 is rotated by way of the engagements of the three resilient pawls 82 of the driving sleeve 8 and the fitted slots 62 of the front sleeve 6, and the drill tool is loosened.

While the present invention has been described and illustrated herein with reference to the preferred embodiments thereof, it will be apparent to those skilled in the art that various changes and modifications may be made therein without departing from the spirit and scope of the invention. Thus, it is intended that the present invention cover the modifications and variations of this invention that come within the scope of the appended claims and their equivalents.

What is claimed is:

1. A locking drill chuck comprising:
a chuck body, a plurality of jaws, a nut, a nut jacket, a front sleeve, and a rear sleeve, wherein the chuck body has an axial hole at a rear end for engaging with a driving shaft, and the rear sleeve close fits with the outer circumference of the rear end of the chuck body, the jaws are separately fitted in a plurality of corresponding inclined holes equally departed away from each other in the chuck body, the nut engages with the jaws,
the locking drill chuck further comprises (i) a locking sleeve provided between the front sleeve and the rear sleeve and (ii) a locking assembly provided between the nut and a stop plane of the chuck body, the locking assembly comprising a locking cap, a plurality of rolling members, and a locking plate, wherein the locking plate has a plurality of helical grooves with helix angle in an end plane thereof, the rolling members being received in the helical grooves, the locking cap has resilient tabs securing the locking plate together with the plurality of rolling members, and the locking sleeve securely connects to the locking plate.

2. The locking drill chuck as recited in claim 1, wherein each of the helical grooves comprises a section $\lambda 1$ where the helix angle is not equal to 0 and a section $\lambda 2$ where the helix angle is equal to 0.

3. The drill chuck as recited in claim 1, wherein the locking sleeve has connecting tenons on an inner circumference, and the locking plate has recesses in a lower portion of an outer circumference, the tenons and the recesses are fitted together with zero clearance.

4. The drill chuck as recited in claim 1, wherein the locking sleeve has a plurality of tenons on a central portion of an outer circumference, and the front sleeve has a plurality of recesses with a width larger than that of the tenons for receiving the tenons.

5. The drill chuck as recited in claim 4, further comprising a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, when the locking sleeve is positioned and guided in the front sleeve.

6. The drill chuck as recited in claim 1, further comprising a driving sleeve deposited between the front sleeve and the nut and the nut jacket, the driving sleeve having a plurality of resilient pawls around an outer circumference and having a plurality of driving keys at an upper end, the front sleeve having a plurality of fitted slots in an inner circumference for receiving the resilient pawls, and the nut having a plurality of recesses at a lower end, when the front sleeve drives the driving sleeve and thereby the nut to transmit torque.

7. The drill chuck as recited in claim 1, wherein the locking plate has a plurality of locking flumes in the lower portion of an outer circumference, and correspondingly the locking cap has a plurality of resilient tabs, the resilient tabs may fit in and move along the locking flumes.

8. The drill chuck as recited in claim 1, further comprising a baffle ring rotatably mounted between the lower ends of the front sleeve and the chuck body to prevent the sleeve from axial shifting with respect to the chuck body.

9. The drill chuck as recited in claim 8, wherein the baffle ring has an circumferential opening, and having a skirt close fitted thereto, when the baffle ring is configured to fit in an annular groove formed in a lower portion of the chuck body, and resist against a rabbet at the lower end of the front sleeve.

10. A locking drill chuck comprising:
a chuck body, a plurality of jaws, a nut, a nut jacket, a front sleeve, and a rear sleeve, wherein (i) the chuck body has an axial hole at a rear end for engaging with a driving shaft, (ii) the rear sleeve close fits with the outer circumference of the rear end of the chuck body, (iii) the jaws are separately fitted in a plurality of corresponding inclined holes equally departed away from each other in the chuck body, and (iv) the nut engages with the jaws,
the locking drill chuck further comprises (i) a locking sleeve provided between the front sleeve and the rear sleeve and (ii) a locking assembly provided between the nut and a stop plane of the chuck body, the locking assembly comprises a locking cap, a plurality of rolling members, and a locking plate, wherein (i) the locking plate has a plurality of helical grooves with helix angle in an end plane thereof, (ii) the rolling members is received in the helical grooves, wherein (iii) each of the helical grooves comprises a section $\lambda 1$ where the helix angle is not equal to 0 and a section $\lambda 2$ where the helix angle is equal to 0, (iv) the locking cap has resilient tabs securing the locking plate together with the plurality of rolling members, and (v) the locking sleeve securely connects to the locking plate.

11. The drill chuck as recited in claim 10, wherein the locking sleeve has connecting tenons on an inner circumference, and the locking plate has recesses in a lower portion of an outer circumference, the tenons and the recesses are fitted together with zero clearance.

12. The drill chuck as recited in claim 10, wherein the locking sleeve has a plurality of tenons on a central portion of an outer circumference, and the front sleeve has a plurality of recesses with a width larger than that of the tenons for receiving the tenons.

13. The drill chuck as recited in claim 12, further comprising a resilient interlock, which is shaped in an opening ring with a plurality of projections, the locking sleeve has a plurality of interlocking notches below the tenons, and the front sleeve has a plurality of axial interlocking slots for receiving the corresponding projections of the resilient interlock passed through the interlocking notches of the locking sleeve, when the locking sleeve is positioned and guided in the front sleeve.

14. The drill chuck as recited in claim 10, further comprising a driving sleeve deposited between the front sleeve and the nut and the nut jacket, the driving sleeve having a plurality of resilient pawls around an outer circumference and having a plurality of driving keys at an upper end, the front sleeve having a plurality of fitted slots in an inner circumference for receiving the resilient pawls, and the nut having a plurality of recesses at a lower end, when the front sleeve drives the driving sleeve and thereby the nut to transmit torque.

15. The drill chuck as recited in claim 10, wherein the locking plate has a plurality of locking flumes in the lower portion of an outer circumference, and correspondingly the locking cap has a plurality of resilient tabs, the resilient tabs may fit in and move along the locking flumes.

16. The drill chuck as recited in claim 10, further comprising a baffle ring rotatably mounted between the lower ends of the front sleeve and the chuck body to prevent the sleeve from axial shifting with respect to the chuck body.

17. The drill chuck as recited in claim 16, wherein the baffle ring has an circumferential opening, and having a skirt close fitted thereto, when the baffle ring is configured to fit in an annular groove formed in a lower portion of the chuck body, and resist against a rabbet at the lower end of the front sleeve.

18. A locking drill chuck comprising:
a chuck body, a plurality of jaws, a nut, a nut jacket, a front sleeve, and a rear sleeve, wherein (i) the chuck body has an axial hole at a rear end for engaging with a driving shaft, (ii) the rear sleeve close fits with the outer circumference of the rear end of the chuck body, (iii) the jaws are separately fitted in a plurality of corresponding inclined holes equally departed away from each other in the chuck body, and (iv) the nut engages with the jaws;
a baffle ring rotatably mounted between the lower ends of the front sleeve and the chuck body to prevent the sleeve from axial shifting with respect to the chuck body; and
the locking drill chuck further comprises (i) a locking sleeve provided between the front sleeve and the rear sleeve and (ii) a locking assembly provided between the nut and a stop plane of the chuck body, the locking assembly comprises a locking cap, a plurality of rolling members, and a locking plate, wherein the locking plate has a plurality of helical grooves with helix angle in an end plane thereof, the rolling members is received in the helical grooves, the locking cap has resilient tabs securing the locking plate together with the plurality of rolling members, and the locking sleeve securely connected to the locking plate.

* * * * *